United States Patent
Kobetz et al.

[15] 3,691,221
[45] Sept. 12, 1972

[54] CO-PRODUCTION OF ALKALI METAL ALUMINUM TETRAALKYLS AND TETRAALKYLLEAD

[72] Inventors: Paul Kobetz, Baton Rouge, La. 70808; Kenneth L. Lindsay, Baton Rouge, La. 70815; Shirl E. Cook, Baton Rouge, La. 70808

[73] Assignee: Ethyl Corporation, New York City, N.Y.

[22] Filed: Nov. 12, 1970

[21] Appl. No.: 89,122

[52] U.S. Cl. .......................... 260/437 R, 260/448 A
[51] Int. Cl. ................................................ C07f 7/24
[58] Field of Search ...................... 260/437 R, 448 A

[56] References Cited

UNITED STATES PATENTS

| | | |
|---|---|---|
| 3,052,702 | 9/1962 | Robinson ............... 260/437 R |
| 3,057,894 | 10/1962 | Robinson ............ 260/448 A X |
| 2,863,894 | 12/1958 | Smith ...................... 260/448 A |
| 3,255,224 | 6/1966 | Ziegler ............... 260/437 R X |
| 3,398,171 | 8/1968 | Giraitis ............... 260/437 R X |

OTHER PUBLICATIONS

Shapiro et al., The Organic Compounds of Lead John Wiley & Sons, N.Y. pp. 94 and 142 (1968)

*Primary Examiner*—Tobias E. Levow
*Assistant Examiner*—H. M. S. Sneed
*Attorney*—Donald L. Johnson, John F. Sieberth and Arthur G. Connolly

[57] ABSTRACT

A process for the preparation of alkali metal aluminum tetraalkyls by a redistribution reaction between tetraalkyllead compounds and alkali metal aluminum tetraalkyls. Their use as intermediates for the production of triethyl aluminum compounds.

19 Claims, No Drawings

CO-PRODUCTION OF ALKALI METAL ALUMINUM TETRAALKYLS AND TETRAALKYLLEAD

BACKGROUND OF THE INVENTION

Alkali metal aluminum tetraalkyl complexes have many varied uses. For example, they may be utilized in combination with metal halides to produce alkylated metal products (U.S. Pat. No. 3,398,171), as electrolytes whether for the precipitation of metallic sodium, or for the electrolytic production of metal alkyls (U.S. Pat. No. 3,255,224).

However, despite the valuable utility of the above mentioned complexes, their production is not without difficulty and expense. For example a contemporary process, disclosed in U.S. Pat. No. 3,255,224, produces alkali metal aluminum tetraalkyl complexes by reacting an aluminum trialkyl complex or an addition compound thereof with an alkali metal hydride and reacting the resulting product with an olefin. This reaction though, is very slow, requiring from 4 to 5 hours.

Therefore, it is an object of this invention to provide a process for the production of alkali metal aluminum tetraalkyl complexes. In particular, it is an object of this invention to provide a novel, inexpensive and fast route to producing sodium aluminum tetramethyl. It is a further object of this invention to provide a novel process for the production of trialkyl aluminum compounds in conjunction with a tetraalkyllead co-product utilizing an alkali metal aluminum tetraalkyl complex as an intermediate.

THE INVENTION

This invention is described, in part, by the following equation:

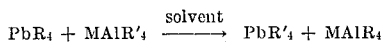
$$PbR_4 + MAlR'_4 \xrightarrow{\text{solvent}} PbR'_4 + MAlR_4$$

wherein M is an alkali metal, R is an alkyl radical containing from one to three carbon atoms, R' is an alkyl radical containing from two to about 12 carbon atoms and R' contains at least one carbon atom more than R. The preceding process takes place in the presence in a liquid inert solvent in which the reactants and the $PbR'_4$ co-product are soluble and in which the $MAlR_4$ product is substantially insoluble.

Among the advantages for this invention are shorter reaction times (1 to 60 min.), utilization of relatively inexpensive reactants and the co-production of a commercially valuable co-product, i.e., tetraalkyllead compounds.

As noted above R' is an alkyl radical containing at least one more carbon atom than R and containing from two to 12 carbon atoms. Thus as reactants alkali metal aluminum tetraalkyls having two to 12 carbon atoms in each alkyl group will be used. Although those containing two to four carbon atoms in each alkyl group are preferred, as these alkyls yield, in the present process, a tetraalkyllead co-product which has a higher commercial value than do tetraalkyllead compounds produced with alkyl radicals containing more than four carbon atoms. For example, tetraethyllead, a very useful antiknock agent for internal combustion engines, is produced by utilizing an alkali metal aluminum tetraethyl complex such as $NaAl(C_2H_5)_4$ as a reactant.

The alkali metal constituent, M, is any member of the alkali metal family, i.e., Li, Na, K, Rb and Cs. Preferred alkali metal aluminum tetraalkyl reactants are those of sodium and potassium as these compounds are readily prepared from relatively inexpensive alkali metals or derivatives thereof. Of these two alkali metals, sodium is the most preferred constituent in the alkali metal aluminum tetraalkyl reactant.

Examples of useful alkali metal aluminum tetraalkyl are: sodium aluminum tetrabutyl, lithium aluminum tetraisopropyl, cesium aluminum diethyl dimethyl, potassium aluminum tetraoctyl, sodium aluminum tetraoctyl and the like. A preferred alkali metal aluminum tetraalkyl is sodium aluminum tetraethyl.

As before said the alkyl constituent of the tetraalkyllead reactant, $PbR_4$, contains from one to three carbon atoms and always at least one less than the alkyl constituent of the alkali metal aluminum tetraalkyl. Preference as to the tetraalkyllead reactant is of course dependent upon the final product sought. For example if sodium aluminum tetramethyl was being sought then tetramethyllead would be preferred.

The solvent utilized in practicing the process of this invention should have the capability of dissolving the tetraalkyllead and the alkali metal aluminum tetraalkyl reactants and the tetraalkyllead co-product but not the alkali metal aluminum tetraalkyl product. In other words the latter product should be substantially insoluble in the inert solvent being utilized. In this manner the alkali metal aluminum tetraalkyl will appear as a precipitate in the solution as it is formed. Such solvents enable an easy separation of the alkali metal aluminum tetraalkyl precipitate by simple filtration, decantation, or centrifugation or other similar liquid-solid separating processes. Failure to utilize such a solvent will not render the reaction chemically inoperative but rather will lead to complex reaction mixtures from which the desired products may not be separated unless more complex and expensive means of separation are employed.

Solvents that have been found to be effective under the criteria stated above are generally liquid hydrocarbon solvents which are inert to the reaction system. When producing alkali metal aluminum tetramethyl complexes it has been found that liquid aromatic hydrocarbon solvents should be used as the alkali metal aluminum tetramethyl complex is insoluble therein while at the same time the reactants and the tetraalkyllead co-products are dissolved in such solvent. Examples of such aromatic solvents are benzene, toluene, xylene, ethylbenzene, tetrahydronaphthalene, trimethyl benzenes, and the like. Toluene is particularly preferred especially when using tetramethyllead as a reactant in the process as it has a boiling point close to that of tetramethyllead and serves as a thermal stabilizer therefor.

Liquid aliphatics and cycloaliphatics are preferred when producing alkali metal aluminum tetraethyl or alkali metal aluminum tetrapropyl complexes as the solubility of these complexes is quite low in such hydrocarbons. Typical of such solvents are hexane, methylcyclohexane, cycloheptane, 2-methylpentanes, hexane, heptane, octane, nonane, and the like.

A temperature of 0° to about 150° C. should be maintained throughout the reaction so as to reduce the likelihood of thermal decomposition or other undesired side reactions. At these temperatures atmospheric pressure is ordinarily used when operating at temperatures in excess of the above. In these cases super-atmospheric pressures are then desirable.

The tetraalkyllead ($PbR_4$) and the alkali metal aluminum tetraalkyl ($MAlR'_4$) reactants can be in any proportions. But it should be understood that each reactant is a limiting reactant and therefore the total mols of product produced will depend upon the reactant which is present in the least molar quantity. Therefore it is convenient to have a 1 mol to 1 mol ratio of the reactants.

Another embodiment of this invention is the production of trialkyl aluminum compounds by an improved process through the utilization of alkali aluminum tetraalkyl complexes produced by the novel process described above. Utilization of this route to trialkyl aluminum complexes is advantageous in that it enables the production of two commercially important classes of organometallics, viz. trialkylaluminum compounds and tetraalkyllead compounds.

The trialkyl aluminum compounds are produced by the reaction of an alkyl aluminum sesquihalide with an alkali metal aluminum tetraalkyl complex ($MAlR_4$) produced by the process hereinbefore described. This process is described by the following equation:

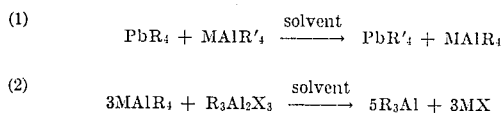

As this reaction is highly exothermic the reaction should take place in the presence of an inert diluent so as to moderate any harmful heat buildup. Such diluent will also act as solvents for the alkyl aluminum halide. Typical diluents are benzene, toluene, cyclohexene, octane, heptane, methylcylcohexane, hexene, 2-methylpentane, tetrahydronaphthalene, ethyl benzene and the like.

The alkyl aluminum sesquihalide reactant may be represented by the formula $R_3Al_2X_3$ wherein R is an alkyl radical preferably identical to the alkyl radical attached to the aluminum atom in the alkali metal tetraalkyl intermediate and X is a halogen. The halogens which are preferred are fluorine and chlorine, with chlorine being the most preferred. Examples of alkyl aluminum sesquihalide compounds which are suitable are ethyl aluminum sesquichloride, propyl aluminum sesquibromide, methyl aluminum sesquifluoride, ethyl aluminum sesquiiodide and the like. Of the above alkyl aluminum sesquihalides, methyl aluminum sesquichloride is most preferred.

The $MAlR_4$ precipitate produced from the reaction of $PbR_4$ and $MAlR'_4$ can be separated from the co-product $PbR'_4$ by any conventional solid-liquid separating means such as centrifugation, decantation, etc.

Preference as to reactants will once again depend upon the particular trialkyl aluminum desired by the practitioner of this invention. For example, to produce trimethyl aluminum, a commercially valuable compound, the reactants are sodium aluminum tetramethyl and methyl aluminum sesquichloride.

The following non-limiting examples will further describe the process of this invention.

EXAMPLE I

Ten grams of sodium aluminum tetraethyl were dissolved in 100 milliliters of toluene. To this solution 16 grams of tetramethyllead were added. The reaction mixture was then heated to 60° C. whereupon solids began to precipitate out of the mixture. The precipitate was then filtered from the solution and dried under a vacuum. The solids weighed 6.0 grams and were insoluble in toluene but soluble in tetrahydrofuran indicating that the precipitate was sodium aluminum tetramethyl. Further, analysis of the lead product by vapor phase chromatography showed that the lead co-product was essentially 100 weight percent tetraetyllead.

EXAMPLE II

The same procedure was followed as in Example I except that 24 grams of tetamethyllead were used. Vapor phase chromatographic analysis of the tetraalkyllead solution present after completion of the reaction showed that 72 weight percent of the lead present was tetraethyllead. The precipitate weighed 6.1 grams and was insoluble in toluene but not in tetrahydrofuran, indicating that the precipitate was sodium aluminum tetramethyl.

EXAMPLE III

The same procedure was followed as in Example I except that 10 grams of sodium aluminum tetrabutyl were dissolved in 50 milliliters of toluene. Subsequently twelve grams of tetramethyllead were added to the solution. The precipitate weighted 3.9 grams and was insoluble in toluene but soluble in tetrahydrofuran, indicating that the precipitate was sodium aluminum tetramethyl.

EXAMPLE IV

The same procedure was followed as in Example I except that the recovered sodium aluminum tetramethyl precipitate is slowly added to a solution of 3.6 grams of methyl aluminum sesquichloride in 50 milliliters of toluene. The products produced are trimethyl aluminum and sodium chloride, the latter being deposited as a precipitate. Chlorine tests showed no aluminum-chlorine bonds in solution indicating 100 percent yield of trimethyl aluminum based upon the sodium aluminum tetramethyl.

Following the above procedures the prior disclosed reactants and solvents may also be utilized to obtain similar beneficial results as shown by the above examples.

We claim:

1. A process for the co-production of alkali metal aluminum tetraalkyl ($MAlR_4$) and tetraalkyllead ($PbR'_4$) which comprises reacting $PbR_4$ and $MAlR'_4$, at a temperature within the range of from about 0° to about 150° C., in the presence of a liquid inert solvent in which the reactants and the $PbR'_4$ are soluble and in which the $MAlR_4$ is substantially insoluble, wherein M is an alkali metal, R is an alkyl radical containing from one to three carbon atoms, R' is an alkyl radical containing from two to about 12 carbon atoms and wherein R' contains at least one carbon atom more than R.

2. The process of claim 1 wherein the alkali metal is sodium or potassium.

3. The process of claim 1 wherein the alkali metal is sodium.

4. The process of claim 1 wherein $PbR_4$ is tetramethyllead.

5. The process of claim 1 wherein $PbR_4$ is tetramethyllead and $MAlR'_4$ is an alkali metal aluminum tetraethyl.

6. The process of claim 1 wherein $PbR_4$ is tetramethyllead and $MAlR'_4$ is sodium aluminum tetraethyl.

7. The process of claim 1 wherein the liquid inert solvent is a hydrocarbon.

8. The process of claim 1 wherein the liquid inert solvent is toluene and wherein the $PbR_4$ is tetramethyllead.

9. The process of claim 1 wherein the temperature is 60° C.

10. The process of claim 1 wherein $PbR_4$ is tetramethyllead, $MAlR'_4$ is sodium aluminum tetraethyl, the solvent is toluene and wherein the temperature is 60° C.

11. A process for preparing tetraalkyllead ($PbR'_4$) and trialkylaluminum ($R_3Al$) which comprises:

1. reacting, at a temperature within the range of from about 0° to about 150° C., $PbR_4$ and $MAlR'_4$ in the presence of a liquid inert solvent in which the reactants are soluble and in which the $MAlR_4$ is substantially insoluble to yield $PbR'_4$ and $MAlR_4$ wherein M is an alkali metal, R is an alkyl radical containing from one to three carbon atoms, R' is an alkyl radical containing from two to about 12 carbon atoms and R' contains at least one carbon atom more than R;

2. separating the $PbR'_4$ and $MAlR_4$; and 3. reacting said $MAlR_4$ with $R_3Al_2X_3$, wherein X is a halogen, to yield $R_3Al$.

12. The process of claim 11 wherein the alkali metal is sodium or potassium.

13. The process of claim 11 wherein the alkali metal is sodium.

14. The process of claim 11 wherein $PbR_4$ is tetramethyllead.

15. The process of claim 11 wherein $PbR_4$ is tetramethyllead and $MAlR'_4$ is sodium aluminum tetraethyl.

16. The process of claim 11 wherein the liquid inert solvent is a hydrocarbon.

17. The process of claim 11 wherein the liquid inert solvent is toluene and wherein $PbR_4$ is tetramethyllead.

18. The process of claim 11 wherein $PbR_4$ is tetramethyllead, $MAlR'_4$ is sodium aluminum tetraethyl, the solvent is toluene and wherein the temperature is 60° C.

19. The process of claim 11 wherein $PbR_4$ is tetramethyllead, $MAlR'_4$ is sodium aluminum tetraethyl, $R_3Al_2X_3$ is methyl aluminum sesquichloride, the solvent is toluene and wherein the temperature is 60° C.

* * * * *